UNITED STATES PATENT OFFICE.

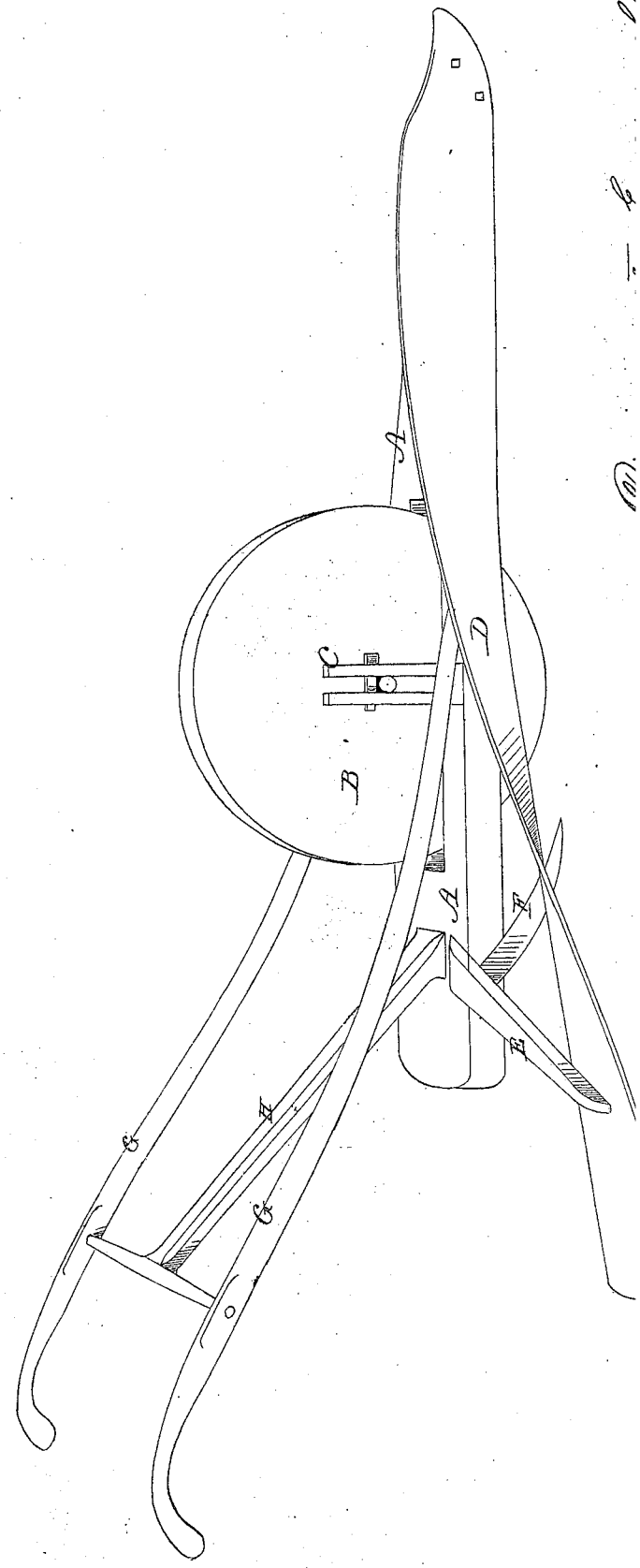
N° 7683. — John J. Herndon — Rice Cutter. — Patented 1. Oct. 1850.

J. J. HERNDON, OF MARLBOROUGH COUNTY, SOUTH CAROLINA.

IMPROVEMENT IN RICE-HARVESTERS.

Specification forming part of Letters Patent No. 7,683, dated October 1, 1850.

*To all whom it may concern:*

Be it known that I, JOHN J. HERNDON, of the county of Marlborough and State of South Carolina, have invented a new and useful instrument or machine for mowing or cutting down rice and other drill-crops, called the "Rice-Cutter;" and I do hereby declare that the following is a full, clear, and exact description of the construction and operation of the same, reference being had to the annexed drawing.

A represents the beam, made of any convenient length, breadth, and thickness, with a mortise through it to receive the wheel B. The axles of the wheel run in the two short upright posts C on each side of the beam, and by means of pins or movable boxes in these posts the beam may be raised or lowered.

D is the wing, made of wood or metal, and is made fast by its broad side to the edge of the beam, near the point, and, running back a little longer than the beam, forms an acute angle with it, and is so shaped or twisted that the front end stands upright, and the hinder part turns over from the beam until the end is brought to lie horizontally, and is secured under the short arm E, which comes out from near the hinder end of the beam. Under this arm, between the wing and the beam, is placed the knife F, pointing downward and forward.

G G are the handles; H, a standard to support the handles.

The instrument is used by placing the edge of the beam on the wing side, close to the drill, then pushing forward, with the wheel running on the ground, the rice is gradually bent down by the wing, and, being caught between it and the knife, is cut off.

What I claim as my invention, and for which I desire to secure Letters Patent, is—

The application of the vertical blade F, and wing attached to either or both sides of a beam, A, and their combination with each other, and the other parts of this machine running by hand or horse power.

J. J. HERNDON.

Witnesses:
J. WRIGHT,
JAMES H. McINTOSH.